Patented Apr. 8, 1947

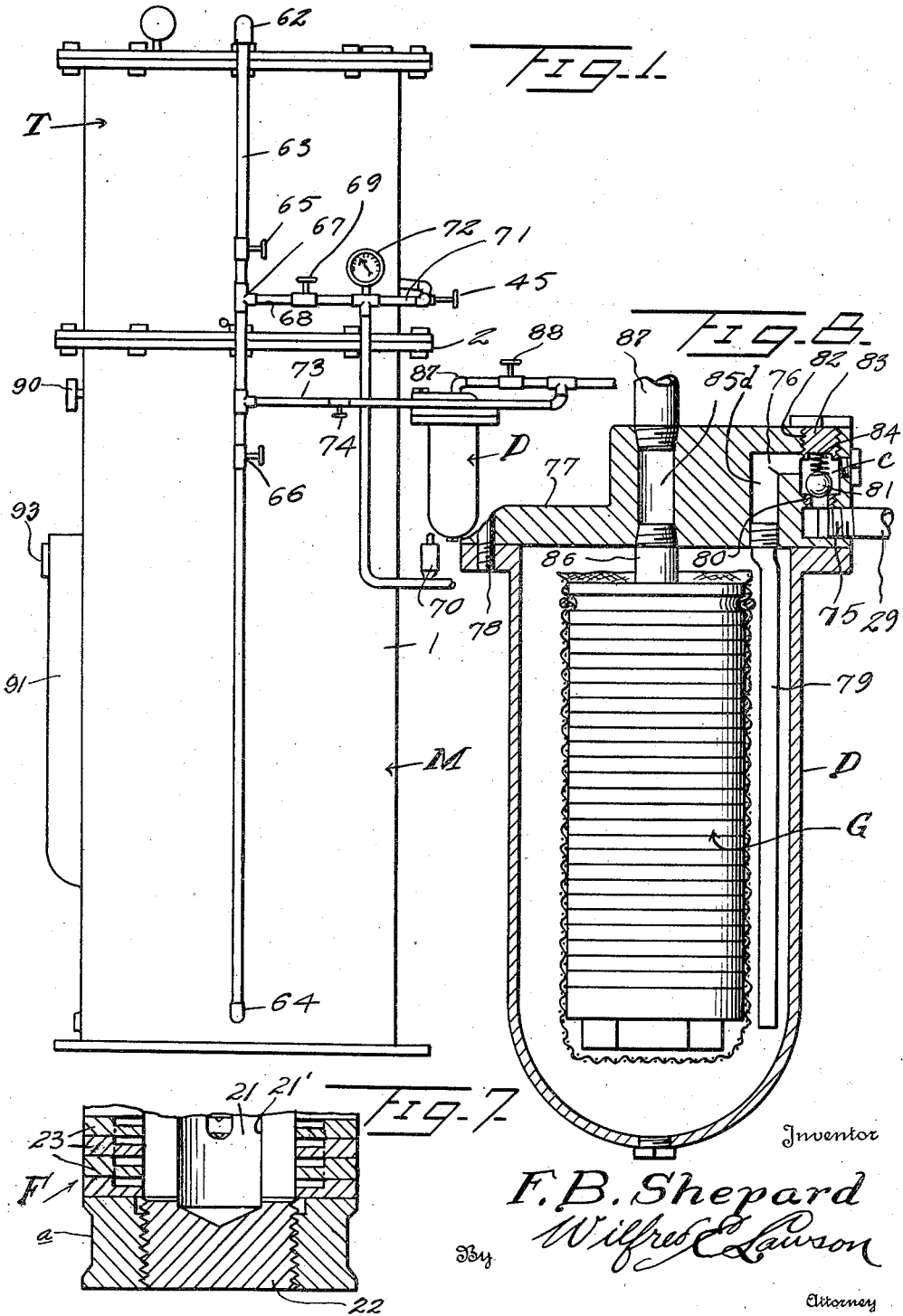

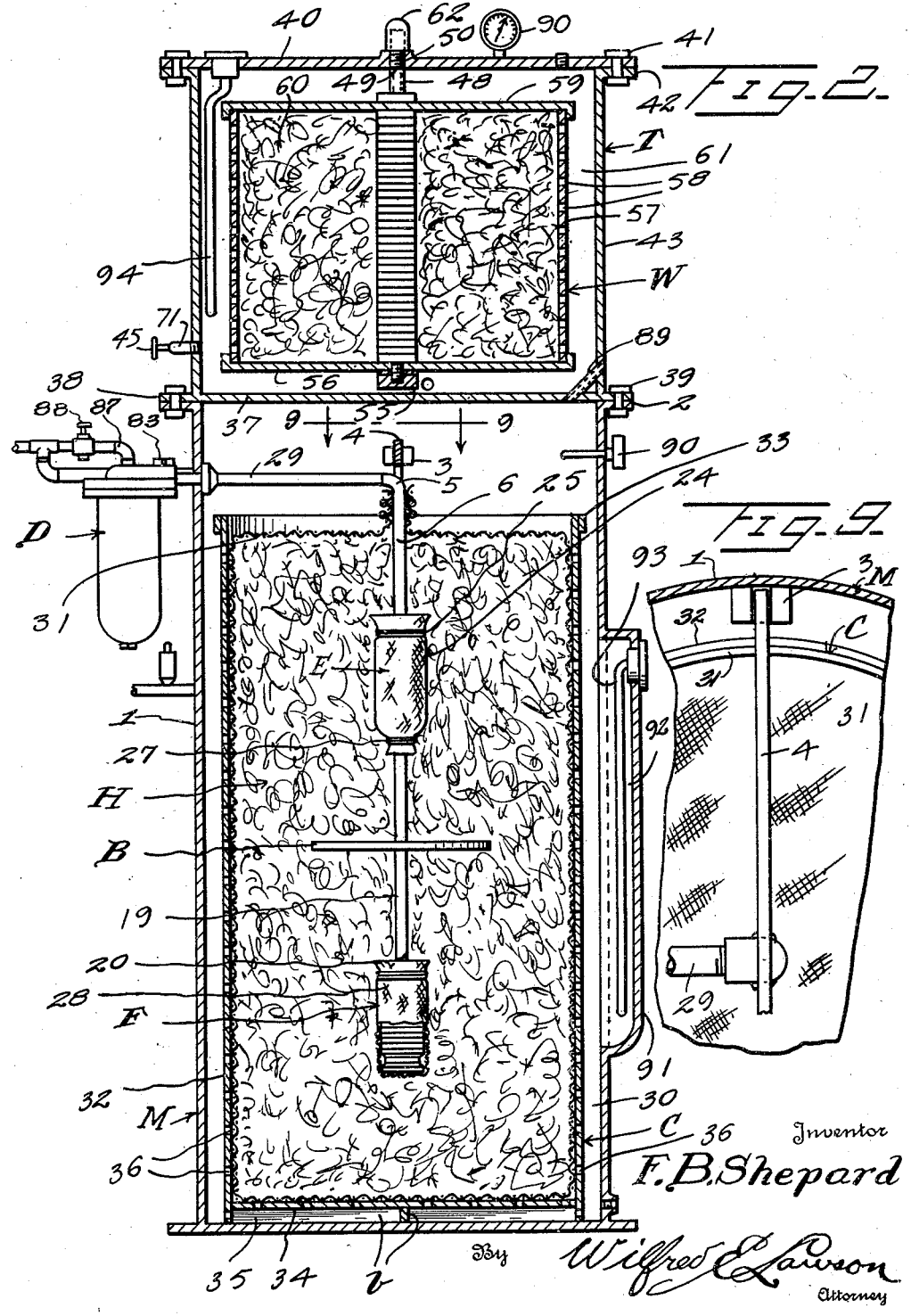

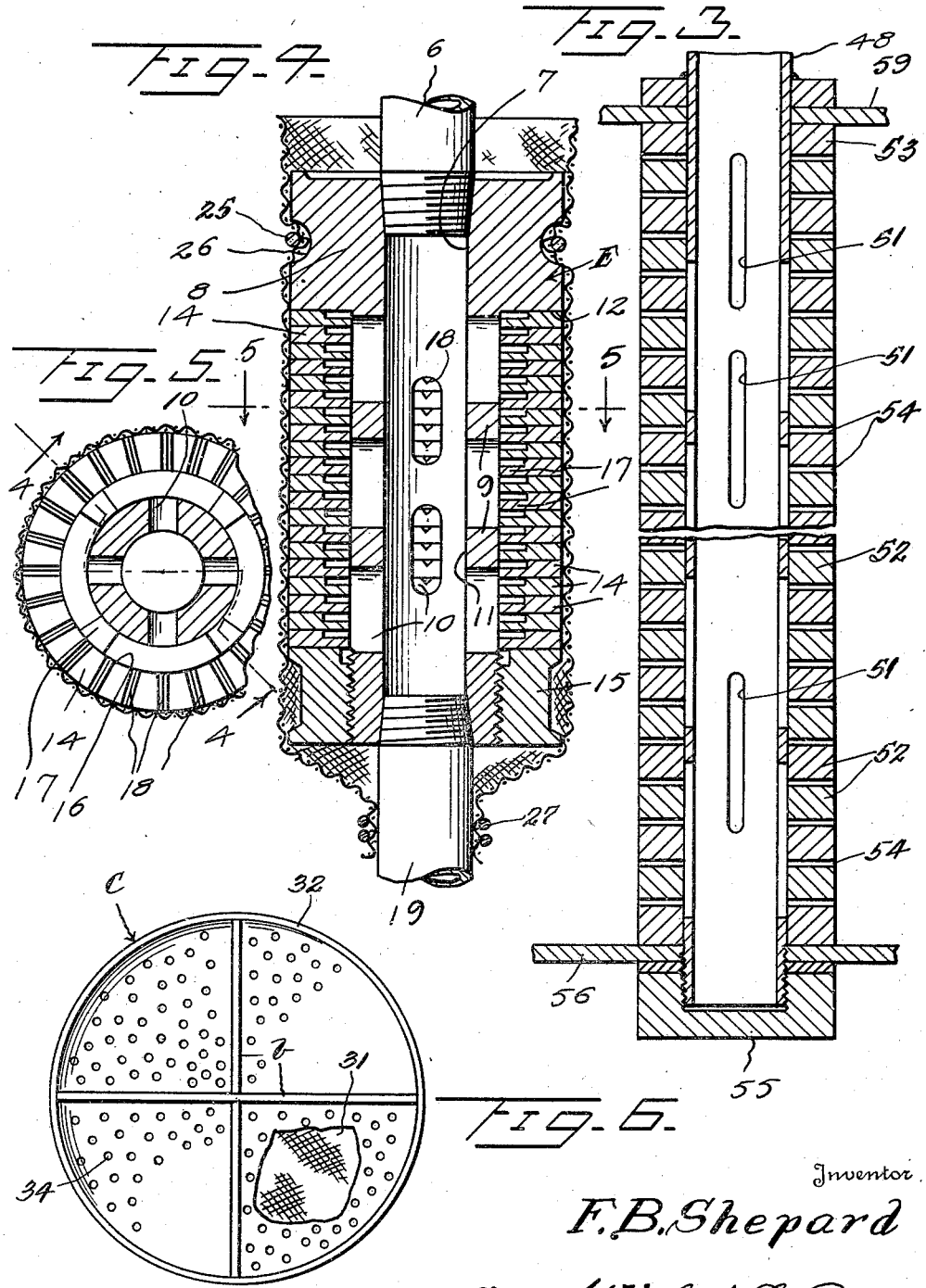

2,418,604

UNITED STATES PATENT OFFICE 2,418,604

FILTERING APPARATUS

Frank B. Shepard, Texon, Tex.

Application November 1, 1943, Serial No. 508,556

3 Claims. (Cl. 210—122.3)

This invention relates to a filtering apparatus, and it is a particular purpose of the invention to provide an apparatus embodying novel means for reclaiming or purifying lubricating and cutting oils.

It is also an object of the invention to provide an apparatus of this kind embodying a filtering media including fuller's earth or the like and wherein means are provided to prevent channeling of such media as the oil flows therethrough.

A still further object of the invention is to provide an apparatus of this kind comprising screening elements arranged one above the other, together with means to divide the flow of oil equally between two adjacent screening elements to provide an efficient flowing condition with increased capacity and at a low operating pressure.

Still another object of the invention is to provide an apparatus of this kind comprising two pressure tanks, together with means for selectively delivering the oil or fluid into either of the tanks and wherein one of the tanks is in vent communication with the other for bleeding air from one of the tanks into the other when said first tank is being filled.

An additional object of the invention is to provide an apparatus of this kind including two pressure tanks adapted to be mounted one upon the other in a manner whereby, when desired, one of the tanks can be readily eliminated.

The invention consists in the details of construction and in the combination and arrangement of the several parts of my improved filtering apparatus whereby certain important advantages are attained, as will be hereinafter more fully set forth.

In order that my invention may be better understood, I will now proceed to describe the same with reference to the accompanying drawings, wherein:

Figure 1 is a view in elevation and of a somewhat diagrammatic character illustrating a filtering apparatus constructed in accordance with an embodiment of the invention;

Figure 2 is an enlarged vertical sectional view taken through the apparatus as illustrated in Figure 1, with parts in elevation;

Figure 3 is a fragmentary sectional view taken through the filtering element as comprised in the upper tank;

Figure 4 is a sectional view on the line 4—4 of Figure 5;

Figure 5 is a fragmentary sectional view taken substantially on the line 5—5 of Figure 4;

Figure 6 is a view in bottom plan, with a portion broken away, of the basket as herein comprised;

Figure 7 is a fragmentary vertical sectional view taken through the lowermost filtering element within the lower tank;

Figure 8 is an enlarged view partly in section and partly in elevation, illustrating the external filtering unit as herein embodied; and Figure 9 is an enlarged detailed sectional view taken substantially on the line 9—9 of Figure 2.

As illustrated in the accompanying drawings, M denotes a main pressure tank of desired dimensions and having its upper or top end open. The upper end of the side wall 1 of this tank M is defined by an outstanding surrounding flange 2, and said wall 1 closely adjacent to the upper or top open end of the tank has suitably secured to the inner faces thereof the opposed plates 3 with which detachably engage the extremities of a supporting bar 4 which, when applied, extends radially across the upper portion of the tank M.

At substantially its longitudinal center this bar 4 has rigidly secured thereto a pipe elbow 5 to one extremity of which is coupled a pipe 6 to extend downwardly within the tank M at substantially the axial center of the tank. This pipe 6 is relatively short and its lower extremity or that end portion remote from the elbow 5 threads into a bore 7, Figure 4, formed through a head 8 which is at the upper end of a tubular cylindrical core 9 of a filtering element E.

This core 9 is of desired length, preferably relatively short, and is provided at points spaced therearound and lengthwise thereof with the elongated perforations or slots 10. The bore 11 of the core 9 is in continuation of the bore 7 of the head 8 and the head 8 is of such diameter as to extend outwardly beyond the core 10 to provide a downwardly facing annular shoulder 12.

Surrounding the core 9 are the annular screening members 14 of duplicate construction and the uppermost member 14 is held against the shoulder 12 and adjacent members 14 are held in close contact one with the other by the binding or holding nut 15 threaded upon the lower extremity of the core 9 and having direct contact with the lowermost member 14.

The central opening 16 of each of these screening members 14 is of a diameter materially in excess of the major diameter of the core 9 but the member 14 is provided therearound with the inwardly and radially disposed lugs 17 of equal lengths and of such length to contact the periphery of the core 9 and thus position the screening members 14 concentric with said core but spaced therefrom.

It is also to be noted that these lugs 17 have their under faces flush with the corresponding face of the member 14 but that the upper faces of such lugs are below the top face of the member 14 so that said lugs 17 will offer no hindrance or obstruction to the flow through any of the radially disposed shallow grooves or channels 18 provided in the top face of each member 14. The oil to be reclaimed readily seeps or flows through these grooves or channels 18 for further passage into the core 9 through the openings 10 and up through the pipe 6, for a purpose to be hereinafter explained.

The lower extremity of the bore 11 of the core 9 is adapted to have threaded therein, or otherwise engaged therewith, the upper end portion of another pipe 19 of desired length and extending downwardly. The lower end portion of this pipe 19 is engaged with the head 20 of another filtering element F. This element F is constructed in substantially the same manner as the filtering element E except that the lower end of the bore 21 of the core 21' is closed by a plug 22, Figure 7, and which plug, when applied, is entirely below the annular screening members 23.

The upper filtering element E has substantially tightly disposed therearound a fabric sack or sock 24, the upper end portion of which is securely held to the head 8 of the element E by a tie wire 25 or other flexible strand, and to facilitate this securement, the periphery of the head 8 is provided circumferentially therearound with the groove or channel 26. The lower extremity of this sack or sock 24 is open but is drawn tightly down across the lowermost screening element 14 and held by the tie wire 27 or otherwise as may be preferred. This lowermost member 14 is provided in its periphery with a circumferentially disposed groove a which may be used to facilitate this attachment instead of binding the sock to the pipe 19, as shown.

The filtering element F also has associated therewith the fabric sack or sock 28 secured to the head of the element F in the same manner as just described with respect to the sack or sock 24. The lower end of the sack or sock 28 is closed and closely underlies the lower or bottom end of the element F.

The pipe 19 at substantially its longitudinal center or at a point midway of the filtering elements E and F has welded or otherwise rigidly secured thereto a baffle disk B. This disk B is of considerable radius and is substantially flat with, of course, the pipe 19 disposed axially therethrough.

Coupled to and leading from the upper end of the elbow 5 is a pipe 29 of a length to extend outwardly of the tank M through the side wall 1 thereof.

The pipes 6 and 19 are in alignment and in the assembly of the apparatus, such aligned pipes 6 and 19 extend downwardly at substantially the axial center of a cylindrical cage or basket C. This cage or basket C is herein disclosed as cylindrical in form and is of a diameter less than the interior of the tank M in which it is positioned so that when the cage or basket C is in applied position, it is surrounded by a space 30.

The top or upper end of this cage or basket C is open so that the desired filler H of fuller's-earth may be readily placed within or removed from the cage or basket C. As illustrated in the drawings, this filler H is contained within a fabric sack 31 of desired capacity so that the filler H constitutes a unit or cartridge which can be quickly applied or removed. After application of the unit or cartridge within the cage or basket C and the pipes 6 and 19 have been inserted within the filler H, the upper open or mouth end of the sack 31 is tightly closed around the adjacent portion of the pipe 6.

In the present embodiment of the invention, this cage or basket C is fabricated from perforated sheet steel to provide a side wall 32 with the upper extremity of such wall reinforced by a surrounding ring or hoop 33 welded to the wall 32. The lower end of the cage or basket C is provided with a perforated metal bottom 34 welded to the side wall 32. This bottom 34 is positioned a distance above the lower end of the wall or barrel 32 to provide a circulating space 35 therebelow. It is to be noted that the wall or barrel 32 has its lowermost perforations 36 in communication with the space 35.

The side wall or barrel 32 below the bottom 34 and immediately adjacent thereto is provided with a cross rib or spider support b to prevent sagging of the bottom 34. This cross rib or spider support b is preferably of metal and suitably welded to the wall or barrel 32.

It is to be pointed out that the screening members 14 of the element E and the corresponding members 23 of the element F provide a comparatively large area in order to assure sufficient screening capacity with the resistance to flow practically equalized throughout the entire surface thereof. The grooves or channels 18 provide minute openings of sufficient capacity to handle a large flow of fluid spread out over a comparatively large area in order to equalize the pressure. The baffle disk B provides means to divide the flow equally between the two elements E and F and also to prevent channeling of the filter H, which results in a much better and more effective flowing condition with a greater capacity at a much lower operating pressure. It is also believed to be apparent that the sacks or socks 24 and 28 provide further screening media.

Superimposed upon the tank M is a second pressure tank T having its lower end closed by a bottom wall 37 which serves as a closure for the top of the tank M when the tank T is applied. The lower end of the tank T is defined by an outstanding surrounding flange 38 which rests upon the flange 2 of the tank M and is detachably secured thereto by the bolts 39 or otherwise as may be preferred.

The top of the tank T is open but is adapted to be closed by the top plate 40, the peripheral portion of which is bolted, as at 41, or otherwise detachably secured to the outstanding surrounding flange 42 defining the upper end of the tank T. It is noted that in such instances where the use of the tank T is dispensed with, this top plate 40 may be used as a closure for the upper end of the tank M and for which reason, in the present embodiment of the invention, the bolt openings in the flanges 2 and 42 are drilled identically to allow for this interchangeable use of the top plate 40 with the tank T or the tank M.

Depending from the top plate 40 at the axial center thereof is a pipe 48 of a length to terminate above but in close proximity to the bottom wall 37 of the tank T. This pipe 48 is threaded, as at 49, within the opening 50 of the plate 40 to allow said pipe 48 to be readily removed or applied. When this plate 40 is to be employed as a closure for the tank T, this pipe 48 is uncoupled and the opening 50 may be plugged or otherwise closed.

The major portion of this pipe 48 is provided at points therearound and lengthwise thereof with the elongated perforations or slots 51, Figure 3, and surrounding such perforated portion of the pipe 48 are the screening members 52, with adjacent members in close contact one with the other and with the uppermost member 52 in direct contact with the surrounding member 53 fixed upon the upper portion of the pipe 48. The top face of each of these members 52 is provided thereacross with the radially disposed and shallow grooves or channels 54 similar to the grooves or channels 18 hereinbefore referred to and for the same purpose.

The lower end portion of the pipe 48 has threaded thereon a blind nut 55 which operates to hold the members 52 in desired assembly upon the pipe 48 and also for clamping the lower portion of the pipe 48 to the perforated bottom 56 of the cylindrical waste cage or basket W. The side wall 57 of this cage or basket W is also provided at spaced points therearound and at points spaced between the top and bottom thereof with the perforations 58. The top of this cage or basket W is closed by the removable top lid or cover 59.

This cage or basket W is tightly packed with a waste filler 60 and this cage or basket W is of a diameter less than the interior diameter of the tank T so that a space 61 surrounds the applied cage or basket W. It is also to be noted that when this cage or basket W is in applied position, its bottom 56 is spaced from the bottom wall 37 of the tank T while its top cover or lid 59 is spaced from the top plate 40 for the tank T.

Leading from and in communication with the upper portion of the pipe 48 through the opening 49 is a discharge pipe 62. This pipe 62 extends radially above the top plate 40 to a desired point therebeyond and the outer end portion of this pipe 62 is continued by a depending pipe line 63 which terminates at a point closely adjacent to the lower end of the tank M and is in communication with said tank M, as at 64, through a side wall 1 thereof. This pipe line 63 at a point above the bottom of the tank T has interposed therein a control valve 65 and said pipe line 63 at a point below the top of the tank M is provided with a control valve 66.

In communication, as at 67, with the pipe line 63 at a point between the valves 65 and 66 is a pipe line 68 leading from a source of dirty oil and which pipe line 68 also has interposed therein a regulating valve 69 and in advance of said valve 69, the pipe line 68 has in communication therewith a spring loaded adjustable by-pass valve 70 of any type preferred. The portion of this pipe line 68 immediately adjacent to the pipe line 63 is at right angles to such pipe line 63 and such portion of the line 68 is in communication through the pipe 71 with the tank T at a desired point above the bottom thereof. This pipe 71 has interposed therein a conventional regulating valve 45. This portion of the pipe line 68 also has in communication therewith a conventional pressure gauge 72, although this gauge may be otherwise positioned along the pipe line 68 as may be preferred.

Also in communication with the pipe line 63 between the valves 65 and 66 is to carry-off pipe 73 leading to a suitable point of discharge and through which is adapted to be delivered the cleaned oil. In this pipe 73 is interposed a conventional control valve 74.

With the valves 65 and 66 open and the valve 69 closed, the apparatus will function in connection with both of the tanks T and M. The oil to be purified will flow through the pipe 71 into the tank T with, of course, the valve 45 open. The purified or reclaimed oil will be conveyed to the carry-off pipe line 73 in a manner to be later described. However, when it is desired to use only the tank M, the valves 45, 65 and 74 are closed and the valve 69 opened. When it is desired to use only the tank T, the valves 66 and 69 are closed and the valves 45, 65 and 74 opened.

The outer end portion of the pipe 29 is in communication, as at 75, with a leg of a port 76 provided in the marginal portion of a top casting or crown member 77 for a filtering case D. This port, as herein disclosed, is in the form of an inverted U and the pipe 29 is in direct communication with the outer leg c thereof.

Held to the under surface of the top casting or crown member 77 by the bolts 78 or otherwise as may be preferred is the filtering case D which depends therefrom. The second leg d of the port 76 has engaged therein and in communication therewith the upper end portion of a down pipe 79 for the purpose of carrying the flow of oil as delivered by the pipe 29 to the lower part of the filtering case D to assist the settlement of water, abrasive and other foreign matter within the oil. As is illustrated in the accompanying drawings, this down pipe 79 terminates closely adjacent to the bottom of the case D.

The leg c of the port 76 has fitted therein a valve seat 80 with which coacts from above the spring-pressed ball valve 81 which provides means to prevent retrograde flow through the port 76 from within the case D. The casting or crown member 77 at a point directly above the leg c of the port 76 is provided with an opening 82 affording communication with said port 76 and this opening 82 is normally closed by a removable plug 83. The spring 84 associated with the ball valve 81 is interposed between this ball valve 81 and the applied plug 83.

The top casting or crown member 77 at substantially its axial center is provided therethrough with a port 85 and coupled within the lower portion of this port 85 and in communication therewith is a depending pipe 86 comprised in the filtering element G. This filtering element G is constructed in a manner similar to the structure hereinbefore described in connection with the filtering element F. It is, therefore, not believed necessary that a detailed description and illustration of this filtering element G is necessary.

In communication from above and secured within the port 85 is a pipe 87 which leads to and is in communication with the pipe line 73 and interposed between this pipe 87 is a control valve 88. This valve 88 is closed when the top tank T only is in use.

The tank T in its lower portion is provided with a vent pipe 89 which opens through the bottom 37 of the tank T and through the side wall 43 of the tank T. This vent pipe 89 is for the purpose of bleeding air from the tank M when filling.

It is also of advantage to provide the tanks M and T with the temperature gauges 90 which may be of any type preferred.

The side wall 1 of the tank M is provided with an elongated and outwardly offset portion 91 to provide a housing 92 opening within the tank M and within this housing 92 is an immersion type electrical heater 93 adapted for communication with a suitable source of electrical energy and which heater may be of such type preferred.

The top plate 40 also carries an immersion type heater 94 to extend within the tank T or, of course, within the tank M when the member 40 is employed in connection with said tank. This heater 94 is also adapted to be connected with a suitable source of electrical energy and may be of such type preferred. These heaters 93 and 94 are preferably thermostatically controlled so that the same will be ineffective when the temperature within the tank T or M is above a predetermined or desired degree.

With the valve arrangement illustrated it will be readily apparent that the fluid to be treated may be run first through the tank T and then through the tank M to and through the filter unit D or such fluid may be run directly into the tank M and through the filter unit D or it may be run directly into the tank T and made to by-pass the third filter unit D as may be desired in accordance with the character of the fluid and the degree of contamination thereof. Where a fluid is known to be contaminated only with certain coarse particles which may be readily removed in the coarser filtering wastes and by means of the grooved filter elements within the tank T, there would be no necessity for passing the fluid through the finer filter material in the tank M or through the disk unit G of the filter element D. Where the maximum of filtering action is desired to remove both coarse and fine particles as well as to remove or trap water which might be contained in oil being filtered, such mixed fluids would be run through the finer straining medium of tank M and through the filter and sediment or water trap which the filter unit D forms.

What is claimed is:

1. A filtering apparatus, comprising in combination, two tanks, a discharge pipe leading from one of the tanks and in communication with the second tank, a filtering means within the first tank through which the fluid passes before flowing out of the discharge pipe into the second tank, a filtering means within the second tank, a supply pipe line in connection with the discharge pipe, valves in the discharge pipe at opposite sides of the connection between the discharge pipe line and the supply pipe, a valved carry-off pipe line leading from the discharge pipe at one side of the connection between the supply pipe line and the discharge pipe, a valve in the discharge pipe at the opposite side of the connection between the supply pipe line and the discharge pipe from said valved carry-off pipe line, a valved pipe line leading from the supply pipe line and delivering into the first tank, the filtering means within the second tank comprising two filter elements directly connected one with the other, a cartridge of fuller's-earth surrounding said elements, and means interposed between the filtering elements for equalizing flow through the fuller's-earth relative to said elements.

2. A filtering apparatus, comprising in combination, two tanks, a discharge pipe leading from one of the tanks and in communication with the second tank, a filtering means within the first tank through which the fluid passes before flowing out of the discharge pipe into the second tank, a filtering means within the second tank, a supply pipe line in connection with the discharge pipe, valves in the discharge pipe at opposite sides of the connection between the discharge pipe line and the supply pipe, a valved carry-off pipe line leading from the discharge pipe at one side of the connection between the supply pipe line and the discharge pipe, a valve in the discharge pipe at the opposite side of the connection between the supply pipe line and the discharge pipe from said valved carry-off pipe line, a valved pipe line leading from the supply pipe line and delivering into the first tank, the filtering means within the second tank comprising two spaced filtering elements, a pipe line interposed between and connecting the elements, one of said elements being in communication with the carry-off line, a cartridge of fuller's earth surrounding the elements, and a baffle disk carried by the pipe line connecting the elements to provide division and deflection of the fluid flow through the fuller's earth equally between the filtering elements and to prevent channeling of the fluid in the fuller's earth.

3. A filtering apparatus, comprising a pair of tanks, a pipe line leading from the top of one tank into the lower part of the second tank and having two valves therein, two pipe lines leading from the first pipe line between said valves, one of the two pipe lines having a control valve therein and constituting a carry-off pipe, the other one of the two pipe lines having two valves therein and leading into the lower part of the first tank, a fluid supply pipe connected with the said other one of the two pipe lines between the two valves therein, an outlet for the second tank, a filtering unit within the first tank and connected with the first mentioned pipe leading therefrom, a filtering unit in the second mentioned tank, and the outlet for the second mentioned tank being connected with and receiving fluid from the filtering unit therein.

FRANK B. SHEPARD.

REFERENCES CITED

The following references are of record in the file of this patent:

UNITED STATES PATENTS

| Number | Name | Date |
|---|---|---|
| 544,262 | Mitchell | Aug. 6, 1895 |
| 591,006 | Parsons | Oct. 5, 1897 |
| 49,013 | Tilden | July 25, 1865 |
| 2,153,062 | Harlan et al. | Apr. 4, 1939 |
| 651,173 | Weaver | June 5, 1900 |
| 1,872,430 | Ericson | Aug. 16, 1932 |
| 1,730,475 | Pelletier | Oct. 8, 1929 |
| 1,822,452 | Pelletier | Sept. 8, 1931 |
| 1,822,440 | Jacobson | Sept. 8, 1931 |
| 2,134,413 | Munoz | Oct. 25, 1938 |
| 1,913,402 | Liddell | June 13, 1933 |
| 632,570 | Howard | Sept. 5, 1899 |
| 2,134,967 | Durgen | Nov. 1, 1938 |
| 364,934 | Hyatt | June 14, 1887 |
| 1,813,226 | Birdsall | July 7, 1931 |
| 620,451 | Helwig | Feb. 28, 1899 |
| 1,995,850 | Harter | Mar. 26, 1935 |
| 2,134,385 | Winslow | Oct. 25, 1938 |
| 2,076,935 | Burckhalter | Apr. 13, 1937 |
| 2,027,876 | Pennebaker | Jan. 14, 1936 |
| 2,076,934 | Burckhalter | Apr. 13, 1937 |
| 2,337,893 | Hutterer | Dec. 28, 1943 |
| 1,927,228 | Compton | Sept. 19, 1933 |
| 2,068,473 | Schwalge | Jan. 19, 1937 |
| 2,280,577 | Guggolz | Apr. 21, 1942 |
| 1,806,701 | Moreton | May 26, 1931 |
| 429,112 | Bowden | June 3, 1890 |

FOREIGN PATENTS

| Number | Country | Date |
|---|---|---|
| 327,663 | Italian | July 17, 1935 |
| 8,568 | British | July 12, 1890 |